(12) United States Patent
Li et al.

(10) Patent No.: US 8,269,750 B2
(45) Date of Patent: Sep. 18, 2012

(54) OPTICAL POSITION INPUT SYSTEM AND METHOD

(75) Inventors: Jin Li, San Jose, CA (US); Guansong Liu, San Jose, CA (US); Donghui Wu, Sunnyvale, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 197 days.

(21) Appl. No.: 12/856,161

(22) Filed: Aug. 13, 2010

(65) Prior Publication Data

US 2012/0038588 A1    Feb. 16, 2012

(51) Int. Cl.
*G06F 3/042* (2006.01)
(52) U.S. Cl. .................... 345/175; 178/18.09
(58) Field of Classification Search .......... 345/173–178; 178/18.01–18.09
See application file for complete search history.

(56) References Cited

U.S. PATENT DOCUMENTS

| | | | |
|---|---|---|---|
| 6,421,042 B1 | 7/2002 | Omura et al. | |
| 6,594,023 B1 * | 7/2003 | Omura et al. | 356/620 |
| 6,943,779 B2 * | 9/2005 | Satoh | 345/173 |
| 7,355,593 B2 * | 4/2008 | Hill et al. | 345/173 |
| 7,355,594 B2 | 4/2008 | Barkan | |
| 7,372,456 B2 * | 5/2008 | McLintock | 345/173 |
| 2008/0143682 A1 * | 6/2008 | Shim et al. | 345/173 |
| 2009/0085887 A1 * | 4/2009 | Chueh et al. | 345/173 |
| 2011/0050640 A1 * | 3/2011 | Lundback et al. | 345/175 |

* cited by examiner

*Primary Examiner* — Jimmy H Nguyen
(74) *Attorney, Agent, or Firm* — Lathrop & Gage LLP

(57) ABSTRACT

Optical position input systems and methods determine positions of at least one pointing objects within an active touch area. At least three imager modules form images of at least one pointing objects within the active touch area. A processor computes a position of each of the at least one pointing object based upon the images formed by the at least three imager modules.

13 Claims, 12 Drawing Sheets

OPTICAL POSITION INPUT SYSTEM AND METHOD

BACKGROUND

Touch screens are currently used in automatic teller machines (ATMs) and other interactive devices. A user interacts with a display of an input device of the ATMs with a pen or with a finger. Other input devices for computers, such as writing pads or tablets, are now available. For instance, writing pads are widely used for writing characters, such as language characters. Some input devices may require a special pointing object such as a special stylus, which may not be as convenient as a finger.

Input devices may also be required for large touch screens configured as white boards, which are often used in meeting rooms and classrooms. To record writing on the white board, a linear sensor may be used to scan the white board to record the writing. The movement of the sensor relative to the board may not be stable and reliable after a period of time. Alternative methods of reading writing on a white board use a touch screen-whiteboard with non-moving pressure sensors, and infrared light emitting diodes (LEDs) positioned around the periphery of the whiteboard, respectively. However, it is very costly to provide many non-moving pressure sensors and a dense population of LEDs for a large screen.

Single position optical touch screens based on triangulation are known in the art. For example, see U.S. Pat. No. 7,355,594 entitled "Optical Touch Screen Arrangement." However, such systems cannot guarantee resolution of multiple touches (i.e., more than one pointing objects) and position accuracy varies based upon the touch relative to the baseline of triangulation. Such systems are also influenced by movements external to the touch area, and may report false positions.

SUMMARY

In an embodiment, an optical input system for detecting a plurality of input positions within an active touch area includes at least three imager modules peripherally positioned around the active touch area, where each imager module captures images of at least one pointing object within the active touch area. The system further includes a processor for determining each of the plurality of input positions, relative to the active touch area, based upon the captured images.

In an embodiment, a method for determining positions of one or more pointing objects within an active touch area includes simultaneously capturing images of the pointing objects using at least three imager modules peripherally positioned around the active touch area. For each pair of captured images of adjacent imager modules, potential positions of the one or more pointing objects are triangulated based upon the captured images of each of the adjacent imager modules. The positions of the one or more pointing objects are determined as being common to potential positions of each pair of captured images.

In an embodiment, an optical input system detects one or more input positions within a rectangular active touch area. The system includes four imager modules positioned proximate to four corners of the rectangular active touch area. Each imager module captures an image of at least one pointing object within the rectangular active touch area, where a connection between each two adjacent imager modules forms a baseline such that the system includes four baselines, and each of the four baselines is orthogonal to each adjacent baseline and being parallel to the other baseline. The optical input system also includes a processor for triangulating the one or more input positions based upon captured images of the at least one pointing object, and determining the one or more input positions as being commonly determined from each pair of adjacent imager modules.

In an embodiment, a method determines positions of one or more pointing objects within an active touch area. The method includes simultaneously capturing images of the one or more pointing objects using four imager modules peripherally positioned proximate each corner of the rectangular active touch area. For each pair of captured images of adjacent imager modules, a processor triangulates potential positions of the one or more pointing objects based upon each pair of captured images; and determines the positions of the one or more pointing objects as being common to the potential positions of each pair of captured images.

The present disclosure provides optical systems and methods for inputting and detecting positions of one or more pointing objects or devices and an optical position input system that includes at least three imager modules. Certain embodiments of the optical position input systems and associated methods provide substantially uniform resolution of object position. Additionally, certain embodiments are advantageously capable of identifying multiple pointing objects and of differentiating a pointing object from a change in background. The position of a pointing object on a touch screen is determined, for example, from images captured by a pair of neighboring imager modules. A final position of the pointing object is determined from a set of two, three, or four positions calculated from images captured by different pairs of imager modules. The position of the pointing object is identified and differentiated from a change in background. Furthermore, multiple pointing objects can be identified simultaneously by using certain embodiments of the optical position input system.

DETAILED DESCRIPTION

Figure 1A:
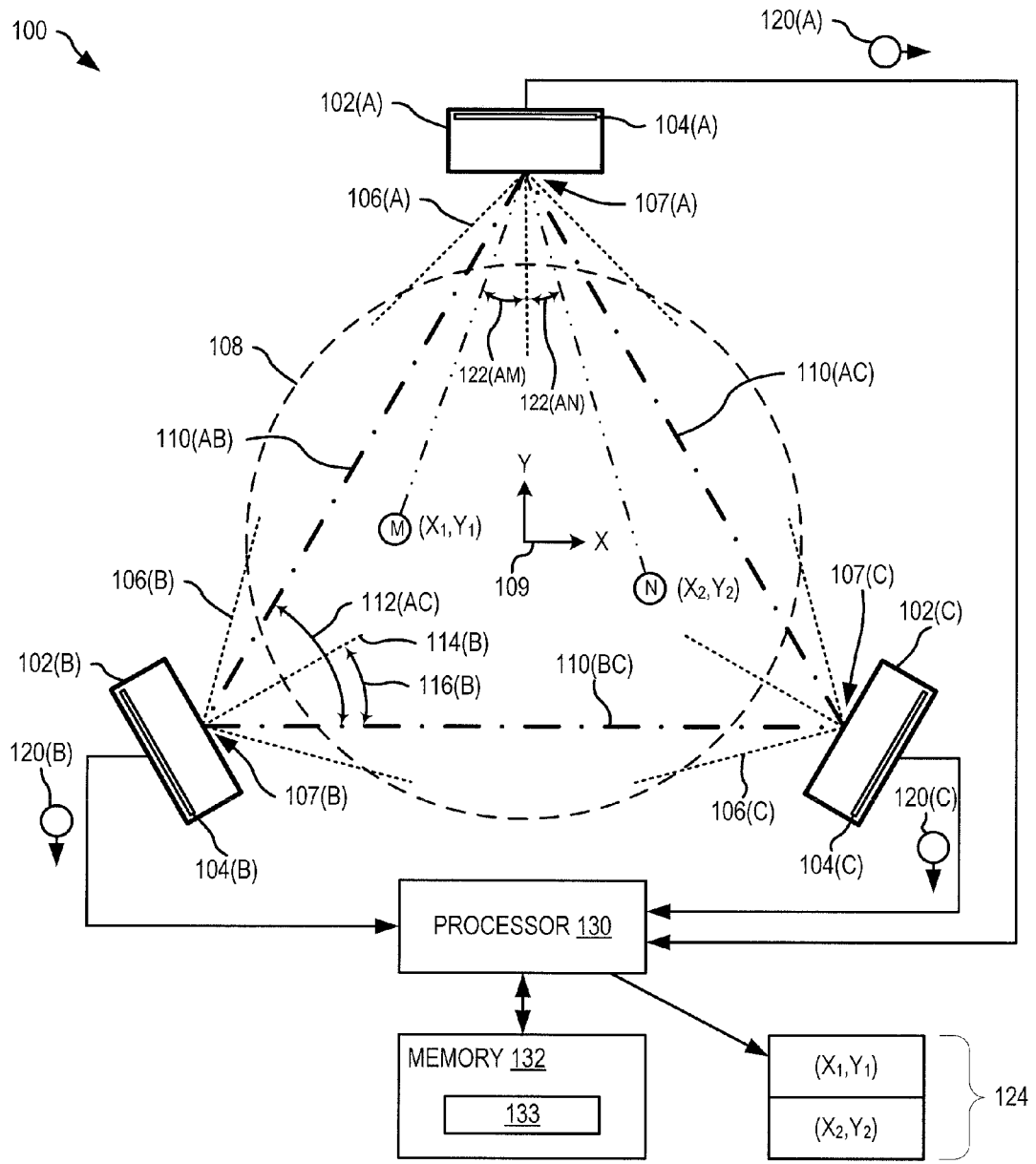
FIG. 1A shows one exemplary optical position input system, in an embodiment.

FIG. 1A shows one exemplary optical position input system 100 with three imager modules 102(A)-102(C) forming a triangle. Although an equilateral triangle is shown, the triangle is not limited to an equilateral triangle. Each imager module 102(A)-102(C) includes an optical sensor array 104 (A)-104(C) with a field of view 106(A)-106(C) originating at a reference point 107(A)-107(C), respectively. Imager modules 102 are peripherally located around, and to capture images of a plurality of pointing objects (e.g., pointing objects M and N) within an active touch area 108. Active touch area 108 has a coordinate reference 109 that has a defined orientation with respect to operation of active touch area 108, and coordinates (e.g., X and Y positions) of reference points 107(A)-107(C) are determined with respect to reference 109. Although two pointing objects M, N, are shown, system 100 may operate with fewer or more pointing objects.

A conceptual baseline 110 is formed between reference points 107 of each adjacent pair of imager modules 102. Baseline 110(AB) is a straight line between reference points 107(A) and 107(B), baseline 110(BC) is a straight line between reference points 107(B) and 107(C), and baseline 110(AC) is a straight line between reference points 107(A) and 107(C). Baselines 110(AB) and 110(BC) form an angle 112(AC), and a field of view reference 114(B) of imager module 102(B) forms an angle 116(B) with baseline 110 (BC). Although not shown in FIG. 1 for clarity of illustration, angles 112(BC) and 112(AB) are formed between baselines 110(AB)-110(AC) and 110(AC)-110(BC), and angles are formed between field of view references 114(A) and 114(C) and angles 112(BC) and 112(AB), respectively.

Active touch area 108 may represent an area for detecting touch of one or more items selected from the group including: a whiteboard, a signature pad, and a computer graphical input device. Each imager module 102 may include a lens for forming an image on optical sensor array 104. Optical sensor array 104 is for example a charge coupled device (CCD) image sensor or a complementary metal oxide semiconductor (CMOS) image sensor. In one embodiment, optical sensor array 104 is a linear image sensor having only one row of pixels and the lens is at least partially cylindrical having optical power in one dimension. In another embodiment, optical sensor array 104 is a two-dimensional array of pixels and the lens is spherical and has optical power in two dimensions. Alternatively, the lens may be cylindrical having optical power in one dimension.

Imager modules 102 are controlled by a processor 130 that receives captured images 120 therefrom. Imager module 102 (A) sends image 120(A) to processor 130, imager module 102(B) sends image 120(B) to processor 130, and imager module 102(C) sends image 120(C) to processor 130. Processing of the captured images may also be performed by processors within, or local to, each imager module 102, without departing from the scope hereof. Processor 130 determines coordinates of each pointing object within active touch area 108 and outputs these coordinates as an output coordinate set 124 for use in other systems, subsystems, or components. For example, pointing object M is shown at coordinates $(X_1, Y_1)$ and pointing object N is shown at coordinates $(X_2, Y_2)$. In one embodiment, processor 130 may provide other functionality to other systems and devices not shown herein.

Processor 130 may output additional information of pointing objects, as derived from determined coordinates, such as a directional vector defining a velocity, without departing from the scope hereof.

In one example of operation, processor 130 captures images from each imager module 102 when pointing objects are not present within active touch area 108 and stores these images as background reference images 133 within a memory 132. Processor 130 then subtracts these background reference images 133 from respective images 120 to better identify pointer objects M and N therein.

Figure 1B:
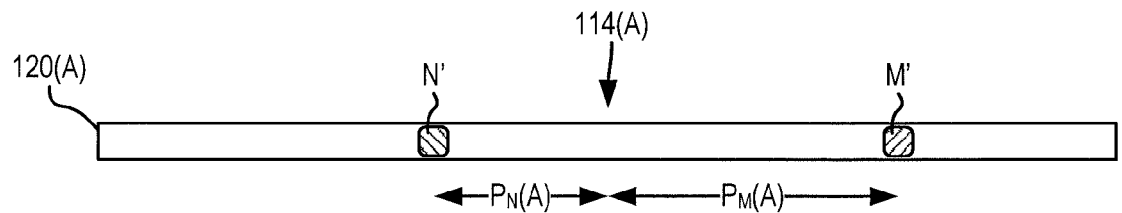
FIGS. 1B-1D show exemplary images from imager modules of the optical input system of FIG. 1A.
Figure 1C:
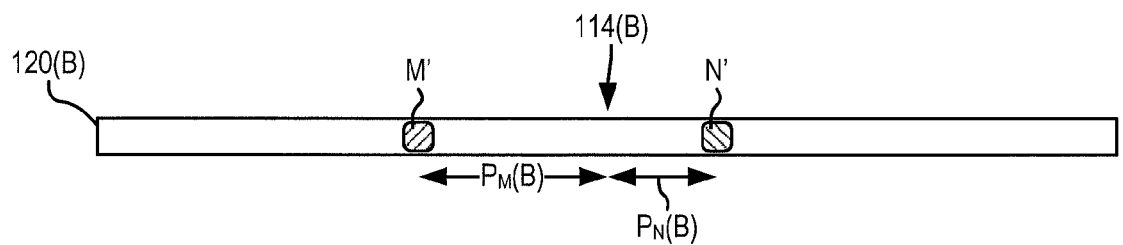
Figure 1D:
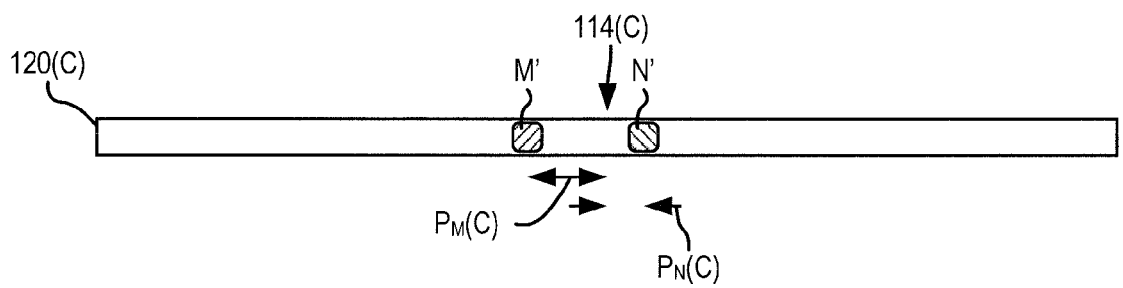

FIGS. 1B-1D show exemplary images 120 from imager modules 102 of optical input system 100 of FIG. 1A. Image 120(A) is a one-dimensional image, which is processed from a captured two-dimensional image or a one-dimensional image captured by imager module 102(A). Image 120(A) includes images M' and N' of pointing objects M and N, respectively. A distance from view reference 114(A) and a central point of image M' is determined as $P_M(A)$ within image 120(A). Similarly, a distance from view reference 114 (A) and a central point of image N' is determined as $P_N(A)$ within image 120(A). $P_M(A)$ depends on an angle 122(AM), with respect to view reference 114(A), from reference point 107(A) to the position of pointing object M. Similarly, $P_N(A)$ depends on an angle 122(AN), with respect to view reference 114(A), from reference point 107(A) to the position of pointing object N. Image 120(B) is a one-dimensional image of imager module 102(B) that includes images M' and N' of pointing objects M and N, respectively. A distance from view reference 114(B) and a central point of image M' is determined as $P_M(B)$ within image 120(B). Similarly, a distance from view reference 114(B) and a central point of image N' is determined as $P_N(B)$ within image 120(B). Although angles 122(BM) and 122(BN) are not shown in FIG. 1A for clarity of illustration, $P_M(B)$ depends on an angle 122(BM), with respect to view reference 114(B), from reference point 107 (B) to the position of pointing object M, and $P_N(B)$ depends on an angle, with respect to view reference 114(B), from reference point 107(B) to the position of pointing object N. Image 120(C) is a one-dimensional image of imager module 102(C) that includes images M' and N' of pointing objects M and N, respectively. A distance from view reference 114(C) and a central point of image M' is determined as $P_M(C)$ within image 120(C). Similarly, a distance from view reference 114 (C) and a central point of image N' is determined as $P_N(C)$ within image 120(C). Although angles 122(CM) and 122 (CN) are not shown in FIG. 1A for clarity of illustration, $P_M(C)$ depends on an angle 122(CM), with respect to view reference 114(C), from reference point 107(C) to the position of pointing object M, and $P_N(C)$ depends on an angle 122 (CN), with respect to view reference 114(C), from reference point 107(C) to the position of pointing object N.

Figure 2A:
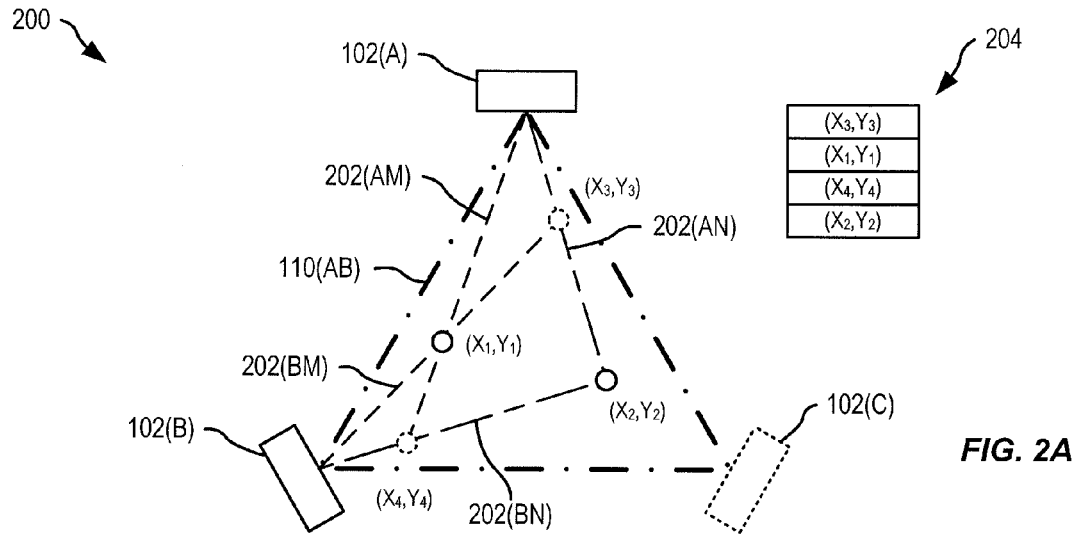
FIGS. 2A-2C show exemplary triangulation to determine multiple input positions from captured images from the optical position input system of FIG. 1A for each adjacent pair of imaging devices.
Figure 2B:
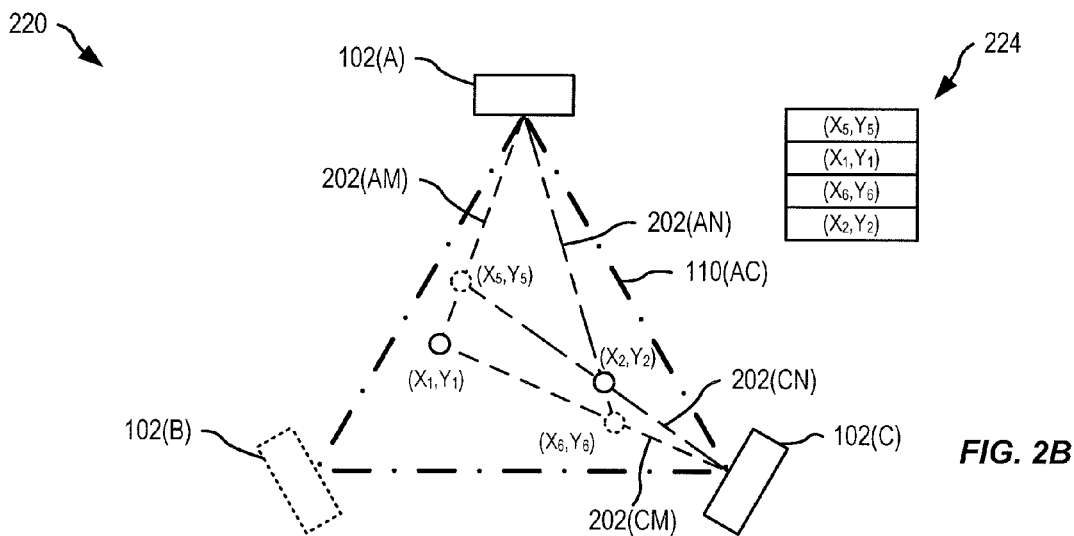
Figure 2C:
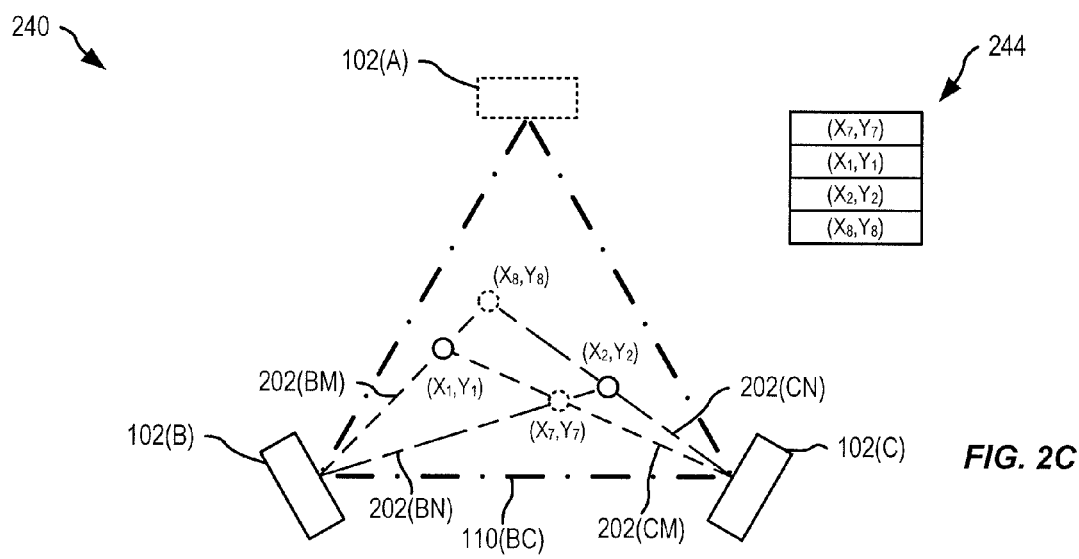

FIGS. 2A-2C show exemplary triangulation to determine multiple input positions from captured images of each adjacent pair of imaging modules 102. System 100 uses triangulation for determining coordinates of potential input positions for each adjacent pair of imager modules 102, based upon determined position values $P_M(A)$, $P_N(A)$, $P_M(B)$, $P_N(B)$, $P_M(C)$, and $P_N(C)$ from captured images. Principles of these triangulation calculations are shown in FIGS. 2A-2C in three separate scenarios 200, 220 and 240. Since the number of pointing objects (e.g., pointing objects M and N) are not initially known by system 100, all potential input positions resulting from vectors 202 are generated for each pair of imager modules 102. That is, if each of two captured images includes two pointing objects images, four potential input positions are identified at crossing points of vectors generated by angles 122 derived from those images.

In other words, the positions of M' and N' in FIG. 1B (image 120(A)) and FIG. 1C (image 120(B)) will generate four potential positions of pointing objects. Among four potential positions, two positions are those of pointing objects M and N, respectively, and two potential positions indicate phantom pointing objects. The elimination of phantom pointing objects is described in the following paragraphs. This problem of phantom objects arises because the system cannot recognize images M' and N', or cannot differentiate M' from N'. It is appreciated that in a conventional and visual triangulation, a human operator may recognize image M' for object M and image N' for object N, thus no triangulation using images M' and N' is performed. Only images M' or only images N' from images 120(A) and 120(B) are used for triangulation. In this case, only two positions will be produced.

In FIG. 2A, scenario 200 shows triangulation for baseline 110(AB) and vectors 202(AM), 202(AN), 202(BM), and 202(BN) based upon determined $P_M(A)$, $P_N(A)$, $P_M(B)$, and $P_N(B)$. In scenario 200, processor 130 generates an intermediate coordinate set 204 with four potential input positions $(X_3, Y_3)$, $(X_1, Y_1)$, $(X_4, Y_4)$, and $(X_2, Y_2)$.

In FIG. 2B, scenario 220 shows triangulation for baseline 110(AC) and vectors 202(AM), 202(AN), 202(CM), and 202(CN) based upon determined $P_M(A)$, $P_N(A)$, $P_M(C)$, and $P_N(C)$. In scenario 220, processor 130 generates an intermediate coordinate set 224 with four potential input positions $(X_5, Y_5)$, $(X_1, Y_1)$, $(X_6, Y_6)$, and $(X_2, Y_2)$.

In FIG. 2C, scenario 240 shows triangulation for baseline 110(BC) and vectors 202(BM), 202(BN), 202(CM), and 202(CN) based upon determined. $P_M(B)$, $P_N(B)$, $P_M(C)$, and $P_N(C)$. In scenario 240, processor 130 generates an intermediate coordinate set 244 with four potential input positions $(X_7, Y_7)$, $(X_1, Y_1)$, $(X_2, Y_2)$, and $(X_8, Y_8)$.

Figure 2D:
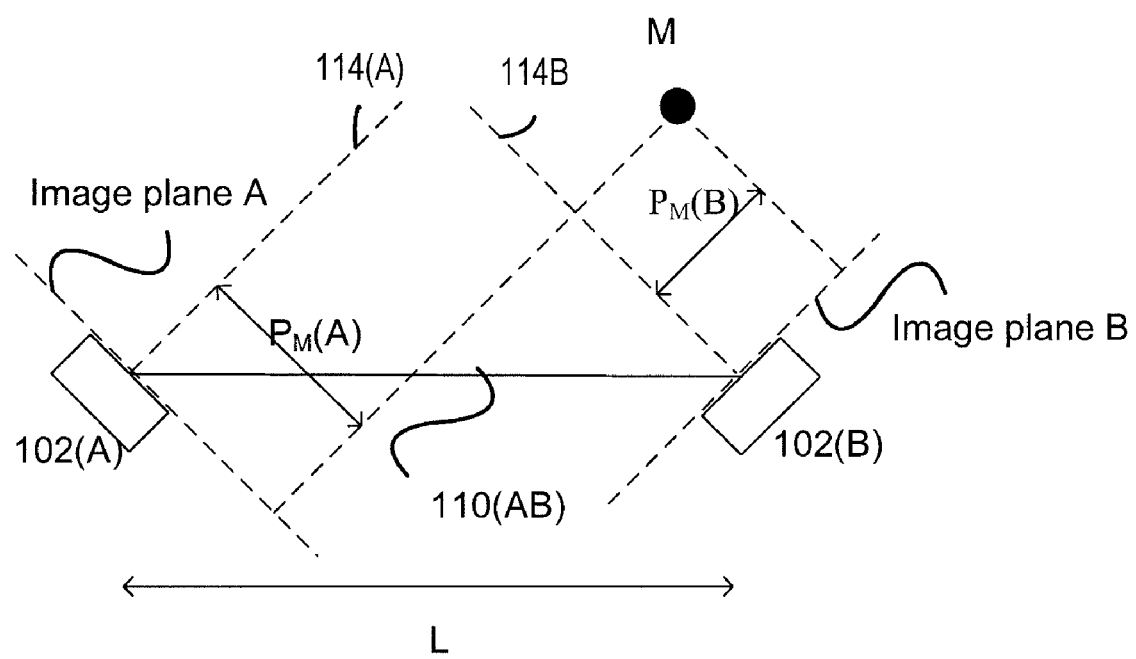
FIG. 2D illustrates coordinates $P_M(A)$ and $P_M(B)$ of an object viewed by two imager modules.

In FIG. 2D, object M is viewed by image modules 102(A) and 102(B). $P_M(A)$ is the distance of object M from the field of view reference 114(A) of image module 102(A). $P_M(B)$ is the distance of object M from the field of view reference 114(B) of image module 102(B). Field of view references 114(A) and 114(B) are perpendicular to respective image planes A and B of image modules 102(A) and 102(B), respectively. The position of object M in (X,Y) coordinates may be obtained from $P_M(A)$ and $P_M(B)$, based upon a distance between image modules 102(A) and 102(B) along baseline 110(AB) connecting image modules 102(A) and 102(B) as indicated by L, and angles between field of view references 114A and 114B with respect to the baseline 110(AB).

Figure 3:
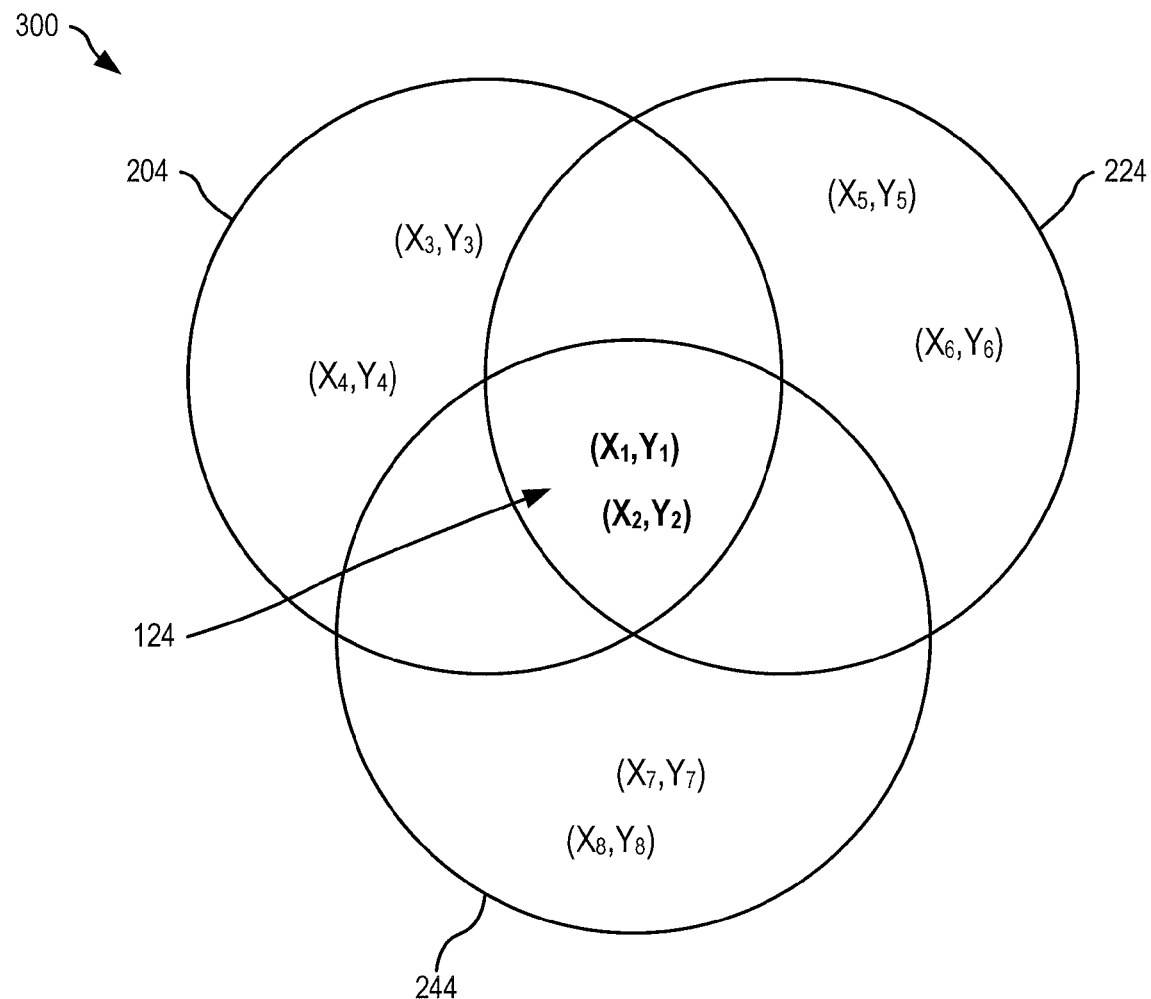
FIG. 3 is a Venn diagram illustrating selection of coordinates for output coordinate set based upon overlap of the intermediate coordinate sets of FIGS. 2A-2C.

FIG. 3 is a Venn diagram 300 illustrating selection of coordinates for output coordinate set 124 based upon overlap of intermediate coordinate sets 204, 224, and 244 of FIGS. 2A-2C. As shown, output coordinate set 124 is formed of only the coordinates common to all three potential coordinate sets 204, 224, and 244.

Figure 4:
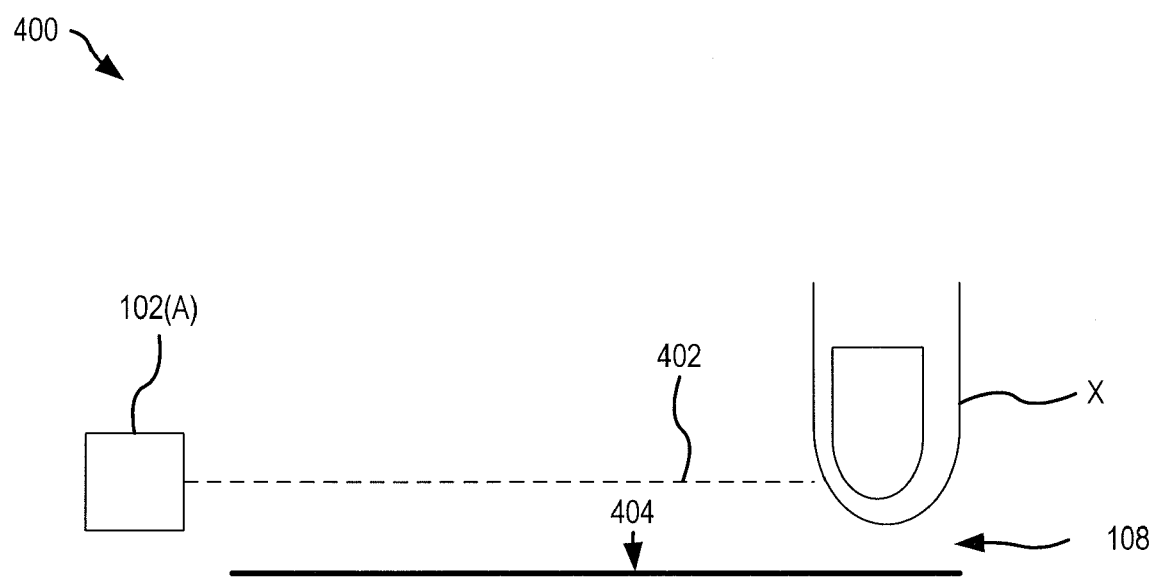
FIG. 4 illustrates a side view of the optical position input system of FIG. 3.

FIG. 4 illustrates a partial side view of optical position input system 100. Each imager module 102 is positioned to have an optical axis 402 parallel to, and just in front of, a surface 404 associated with active touch area 108. In one embodiment, surface 404 is not in field of view 106 of imager modules 102, thereby reducing the effect of light reflected by surface 404. Pointing object X is illustrated as a finger, but may represent other pointing objects such as a pen, a whiteboard marker, and a wooden pointer, among other options.

Figure 5:
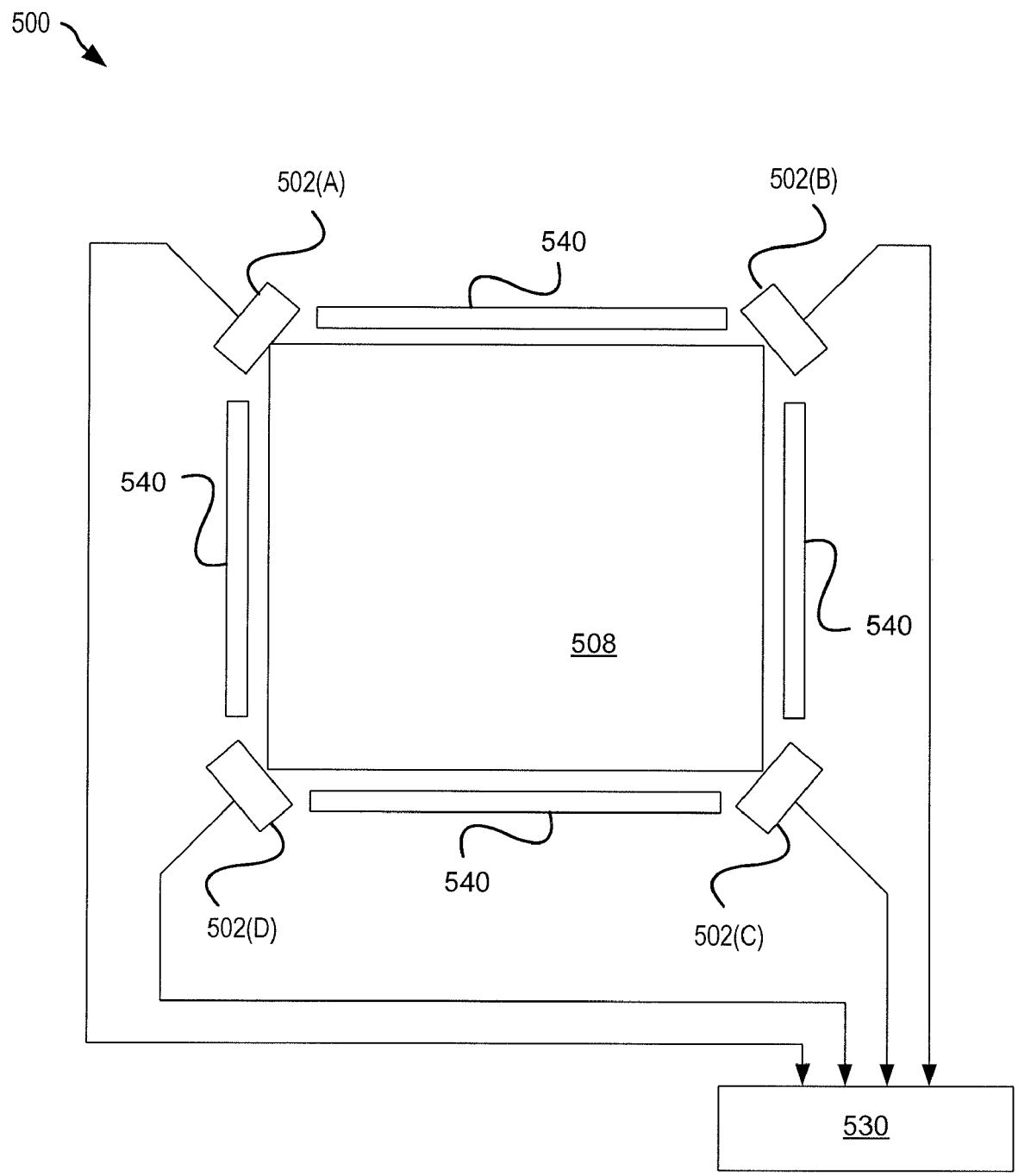
FIG. 5 illustrates an optical position input system including four imager modules, diffuse light sources and a processor, according to an embodiment.

FIG. 5 shows one exemplary optical position input system 500 with four imager modules 502(A), 502(B), 502(C), and 502(D) disposed at four corners of a rectangular active touch area 508. Optical position input system 500 is, for example, an input device to a computer, such as a writing pad or tablet, or a white board. Imager modules 502 are coupled to a processor 530 that identifies positions of each of one or more pointing objects located within active touch area 508. In one embodiment, active touch area 508 may be a writing pad or whiteboard, to capture input from pointer objects used thereon. That is, imager modules 502 and processor 530 may be constructed as a unit for combination with other devices, for example to capture positions of writing devices and pointers.

Optical position input system 500 may also include diffuse light sources 540 disposed proximate to each of four sides of active touch area 508, or in any other configuration proximate to active touch area 508. Diffuse light sources 540 help provide adequate illumination for the imager modules to allow accurate detection of objects. Diffuse light sources 540 may have an elongated shape, or any other shape. Different types of diffuse light sources may be used. In an alternative embodiment, one diffuse light source 540 may be used. Intensity of diffuse lighting sources 540 may be controlled by processor 530 to capture images of pointing objects in various changing environments. Embodiments of the present invention may include various configurations of diffuse light sources, including types of sources, shapes and positions of sources relative to active touch area 508. Active touch area 508 may represent one or more of a computer writing pad or tablet, a white board, an ATM touch screen, a computer monitor, a large screen display or any position input screen for recording devices and/or interactive devices including games.

Figure 6:
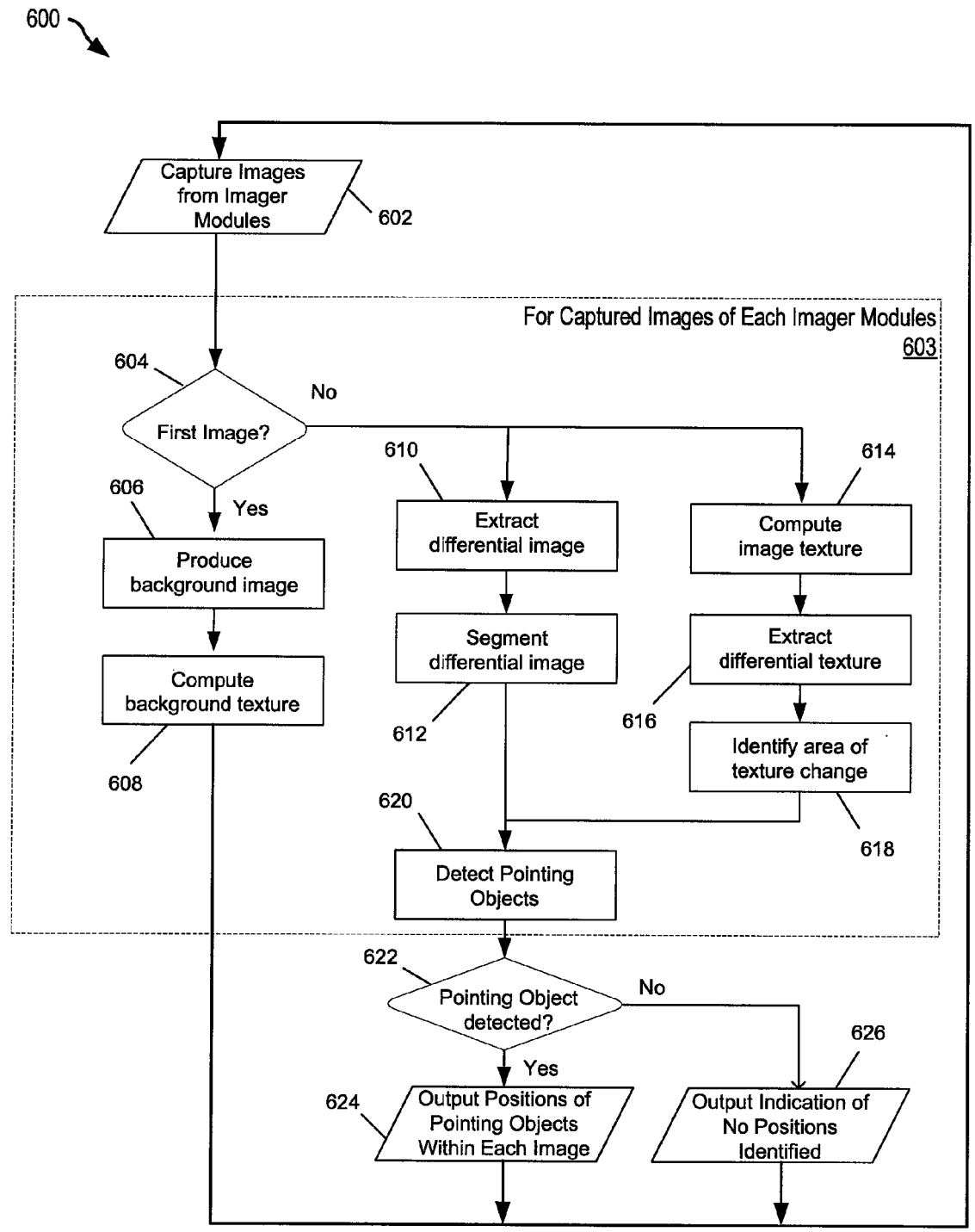
FIG. 6 is a flow chart illustrating steps for determination of position of a pointing object in an image captured by one imager module.

FIG. 6 is a flow chart illustrating an optical position input method 600. Method 600 is implemented for example by processor 130 and memory 132 of system 100, FIG. 1, and by processor 530 of system 500, FIG. 5. Method 600 identifies a pointing object and determines its position in a captured image by using one imager module. Method 600 may also be applied to each of three imager modules, where three modules are jointly used to identify and determine position of a pointing object. In step 602, images are captured from each imager module. In one example of step 602, processor 130 captures images 120 from each imager module 102. In another example of step 602, processor 530 captures images from each imager module 502. Steps 604 through 620 repeat for each captured image, as indicated by dashed outline 603. Specifically, positions of pointing object images are identified within each captured image. Step 604 is a decision. If, in step 604, method 600 determines that these are first images, method continues with step 606; otherwise method 600 continues with steps 610 and 614. In one example of step 604, when system 100 is activated (e.g., turned on), step 604 identifies the first images 120 received from imager modules 102. Method 600 assumes that upon start-up of the system (e.g., system 100, 500) there is no pointing object within the active touch area (e.g., active touch area 108, 508). Method 600 may also utilize a plurality of images (e.g., a first 10 images) from each imager module, such that decision 604 switches to steps 610 and 614 only after these images are received. In step 606, method 600 produces background images. In one example of step 606, processor 130 utilizes first images 120 from each imager module 102 to generate a background image for that imager module. In one example, processor 130 averages images from one imager module 102 to generate a background image 133 for that imager module. In step 608, method 600 computes a background texture for each background image generated by step 606. Texture may be utilized to reduce the effect of shadow and reflection when detecting pointing objects. Method 600 then returns to step 602 to receive next images.

Step sequences (a) 610 and 612, and (b) 614, 616, and 618, may occur in parallel, as show, or may be sequential. In step 610, method 600 extracts a differential image. In one example of step 610, processor 130 subtracts background images 133 from the current set of images 120 to form a differential image for each imager module 102. In step 612, method 600 segments the differential image. In one example of step 612, processor 130 segments the differential images of step 610. The segmented image may be a pointing object, a shadow on the touch screen, or light reflected from the touch screen.

In step 614, method 600 computes image texture of the current images. In one example of step 614, processor 130 generate image textures from current images 120. In step 616, method 600 extracts differential texture. In one example of step 616, processor 130 determines differences between background textures of step 608 and image textures of step 614. In step 618, method 600 identifies areas of texture change. In one example of step 618, processor 130 identifies areas of texture change, as compared to the background texture of step 608, within image textures of step 614. In step 620, method 600 combines segmented images of step 612 with identified areas of changes in texture of step 618 to identify pointing objects within the images.

Segmenting the differential image of step 610 yields better differentiation of the image of the pointing object from shadow, and reflection from the touch screen. Extracting the differential texture identifies a changed texture area. Based upon the changed texture area, the image of the pointing object can be better identified. Specifically, positions of pointing objects M and N, i.e., $P_M(A)$, $P_N(A)$, $P_M(B)$, $P_N(B)$, $P_M(C)$, and $P_N(C)$, within images received from each imager module (e.g., imager modules 102, 502) are determined.

Step 622 is a decision. If, in step 622, method 600 determines that at least one pointing object is identified in the captured images, method 600 continues with step 624; otherwise method 600 continues with step 626. In step 624, method 600 outputs positions of pointing objects in association with the imager module that captured the image used to determine the positions. In one example of step 624, processor 130 outputs position values $P_M(A)$ and $P_N(A)$ with respect to image 120(A), position values $P_M(B)$ and $P_N(B)$ with respect to image 120(B), and position values $P_M(C)$ and $P_N(C)$ with respect to image 120(C). Method 600 then continues with step 602. In step 626, method 600 outputs indication that no pointing objects were identified within the images. In one example of step 626, processor 130 outputs a "NULL" indicating no positions were identified within the current images.

It is important to note that these position values $P_M(A)$, $P_N(A)$, $P_M(B)$, $P_N(B)$, $P_M(C)$, and $P_N(C)$ are not X-Y coordinates of the pointing objects M and N with reference to the active touch area. If a pointing object was not successfully detected in step 620, a special value is assigned in step 626 to indicate that no pointing object is detected. As mentioned previously, position values $P_M(A)$, $P_N(A)$, $P_M(B)$, $P_N(B)$, $P_M(C)$, and $P_N(C)$ are one-dimensional derived from captured one-dimensional images or from one-dimensional images processed from captured two-dimensional images.

Figure 7:
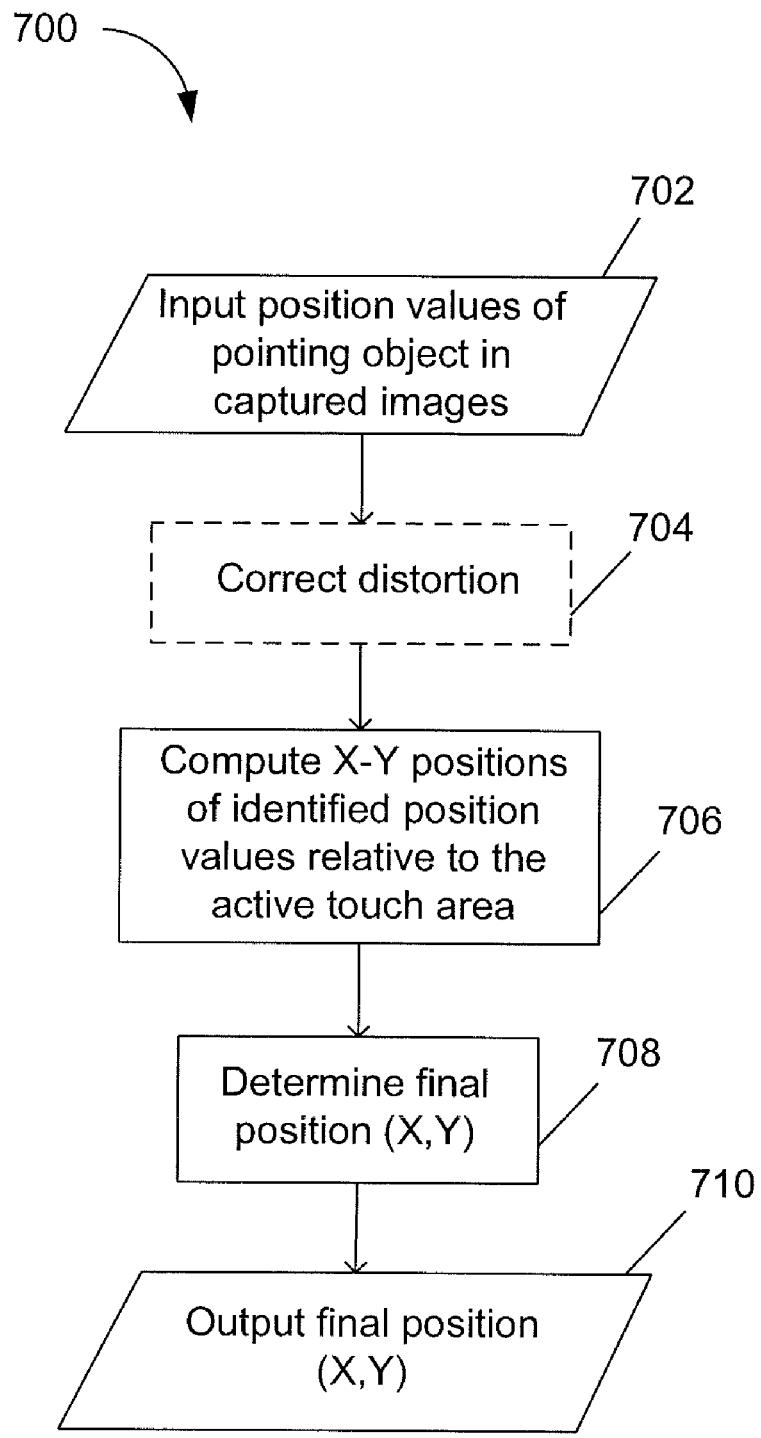
FIG. 7 is a flow chart illustrating steps for determination of position of a pointing object on a touch screen, based upon captured images by at least three imager modules.

FIG. 7 is a flow chart illustrating one exemplary method 700 for determining X-Y coordinates of pointing objects M and N with reference to active touch area 108. Method 700 may be implemented by processor 130, 530 of systems 100, 500, of FIGS. 1A and 5, respectively. In step 702, method 700 inputs identified position values of pointing objects within captured images from method 600 of FIG. 6. In one example of step 702, processor 130 inputs position values $P_M(A)$, $P_N(A)$, $P_M(B)$, $P_N(B)$, $P_M(C)$, and $P_N(C)$ from step 624 of method 600. Step 704 is optional. If included, in step 704, method 700 corrects distortion to improve accuracy of identified position values. In one example of step 704, position values $P_M(A)$, $P_N(A)$, $P_M(B)$, $P_N(B)$, $P_M(C)$, and $P_N(C)$ are corrected based upon configuration parameters determined during a calibration process of system 100. Step 704 may be important for imager modules 102, 502, having large viewing angles.

In step 706, method 700 computes X-Y positions of identified pointing objects relative to the active touch area. In one example of step 706, processor 130 determines X-Y coordinates $(X_1, Y_1)$, $(X_2, Y_2)$, $(X_3, Y_3)$, $(X_4, Y_4)$, $(X_5, Y_5)$, $(X_6, Y_6)$, $(X_7, Y_7)$, and $(X_8, Y_8)$ for position values $P_M(A)$, $P_N(A)$, $P_M(B)$, $P_N(B)$, $P_M(C)$, and $P_N(C)$ based upon triangulation as shown in FIGS. 2A-2D.

In step 708, method 700 determines final X-Y values for identified pointing objects. In one example of step 708, process 130 selects $(X_1, Y_1)$ and $(X_2, Y_2)$ as being actual positions of pointing objects M and N identified by each pair imager modules 102, as demonstrated by Venn diagram 300 of FIG. 3. In particular, common X-Y positions $(X_1, Y_1)$, $(X_2, Y_2)$ may be further processed to improve accuracy of the identified position based upon positional resolution of each pair of imager modules 102, as described below in more detail. In step 710, method 700 outputs final X-Y values. In one example of step 710, processor 130 outputs $(X_1, Y_1)$, $(X_2, Y_2)$ as output coordinate set 124.

Calibration of optical position input system 100, 500 may be necessary because the alignment of cameras is often imperfect. Systems 100, 500 may be calibrated by placing calibration touch points within active touch areas 108, 508. These calibration touch points may be made by users upon startup of the system, or upon first use of the system. For example, the user may be directed to place a pointing object in or on marked calibration touch points. Calibration may be implemented based upon two sets of points, one set of calibration touch points with known positions, and another set of computed positions of the pointing object. The positions are computed based upon default system alignment parameters. The calibration may be performed using, for example, inverse bilinear interpolation and/or non-linear transformation, among other methods.

Figure 8:
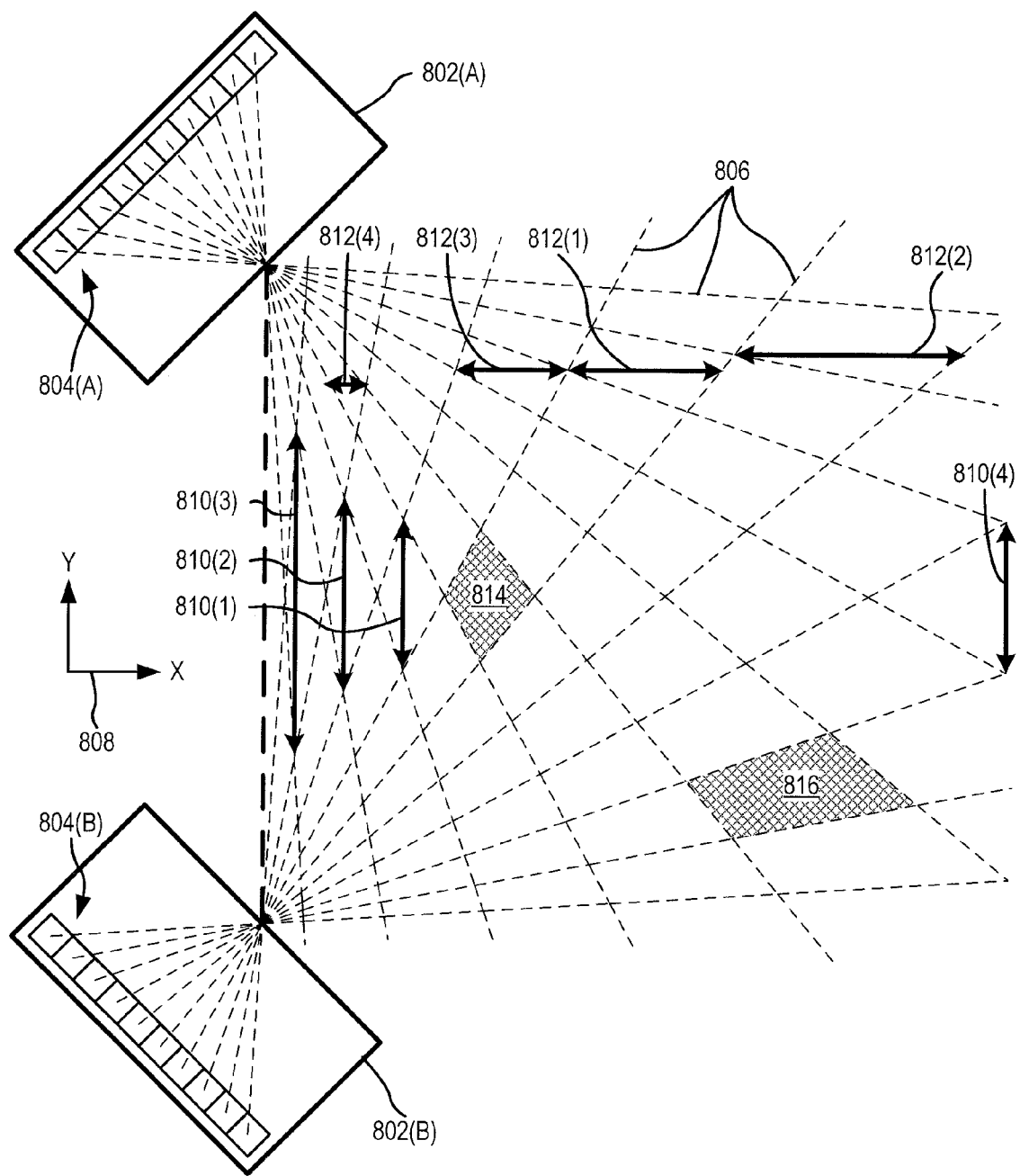
FIG. 8 shows analysis of position resolution of an optical input system using two imager modules.

A further benefit of utilizing three or more imager modules (e.g., imager modules 102, 502) is that uniformity of position resolution improves. FIG. 8 shows an analysis of resolution of optical position input using two imagers 802(A) and 802(B). Each imager 802(A), 802(B) includes a linear array sensor 804(A), 804(B), respectively, for example, each with ten pixels. Exemplary ray traces 806 are shown emanating from each pixel to illustrate areas imaged by each pixel. As shown, position resolution varies over the imaged area. For example, resolution in a Y direction, as indicated by axes 808, at a position proximate to a baseline between imager 802(A) and 802(B) rapidly increases as the position moves toward the center of the touch area and slightly decreases as the position approaches the edge of one active touch area opposite the baseline, as shown by arrows 810(3), 810(2), 810(1) and 810(4). Notice that longer arrows indicate lower resolutions. Similarly, in areas away from imagers 802, X-resolution rapidly decreases as indicated by arrows 812(1), 812(2) and 812(3). Areas resolved by sensors 804 vary significantly, as shown by areas 814 and 816.

Figure 9:
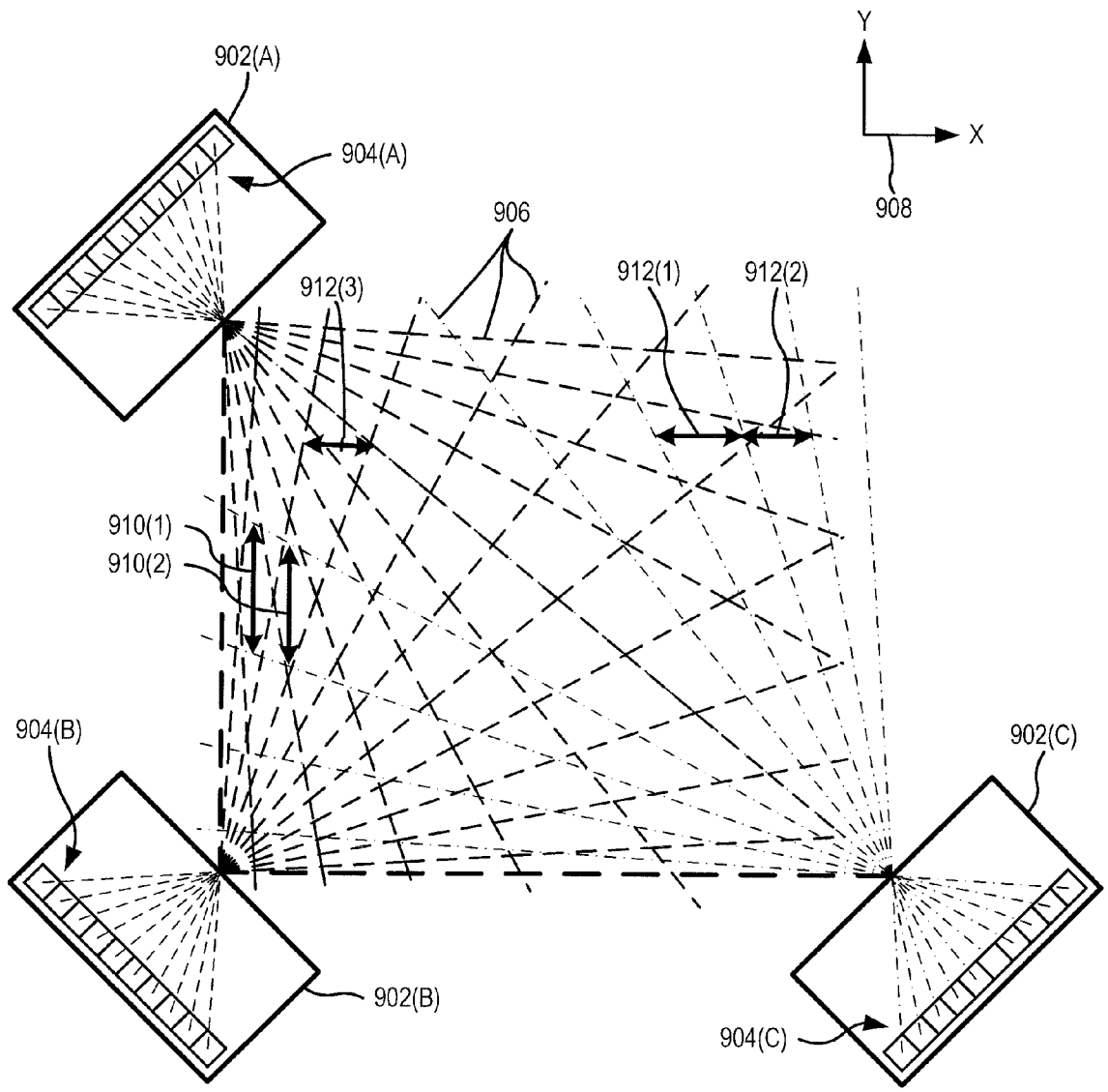
FIG. 9 shows analysis of position resolution of an optical input system including three orthogonally positioned imager modules, according to an embodiment.

FIG. 9 shows an analysis of resolution with three orthogonally positioned imager modules 902(A), 902(B) and 902(C), for example, each having a sensor array 904(A), 904(B), and 904(C), respectively, of ten pixels. Exemplary ray traces 906 are shown emanating from each pixel to illustrate areas imaged by each pixel. Resolution in the Y direction, as indicated by axes 908, for an area proximate to the baseline between imager modules 902(A) and 902(B) is improved over the two-module system, as indicated by arrows 910(1) and 910(2), by selection of position values resulting from images captured from imager modules 902(B) and 902(C), since these imager modules have better Y-resolution in that area. Similarly, resolution in an X direction is improved in an area away from imager modules 902(A) and 902(B), as indicated by arrows 912(1) and 912(2). Thus, by selecting the determined X and Y positions using images from the imager modules having the highest resolution in that areas, the resulting accuracy is improved.

Figure 10:
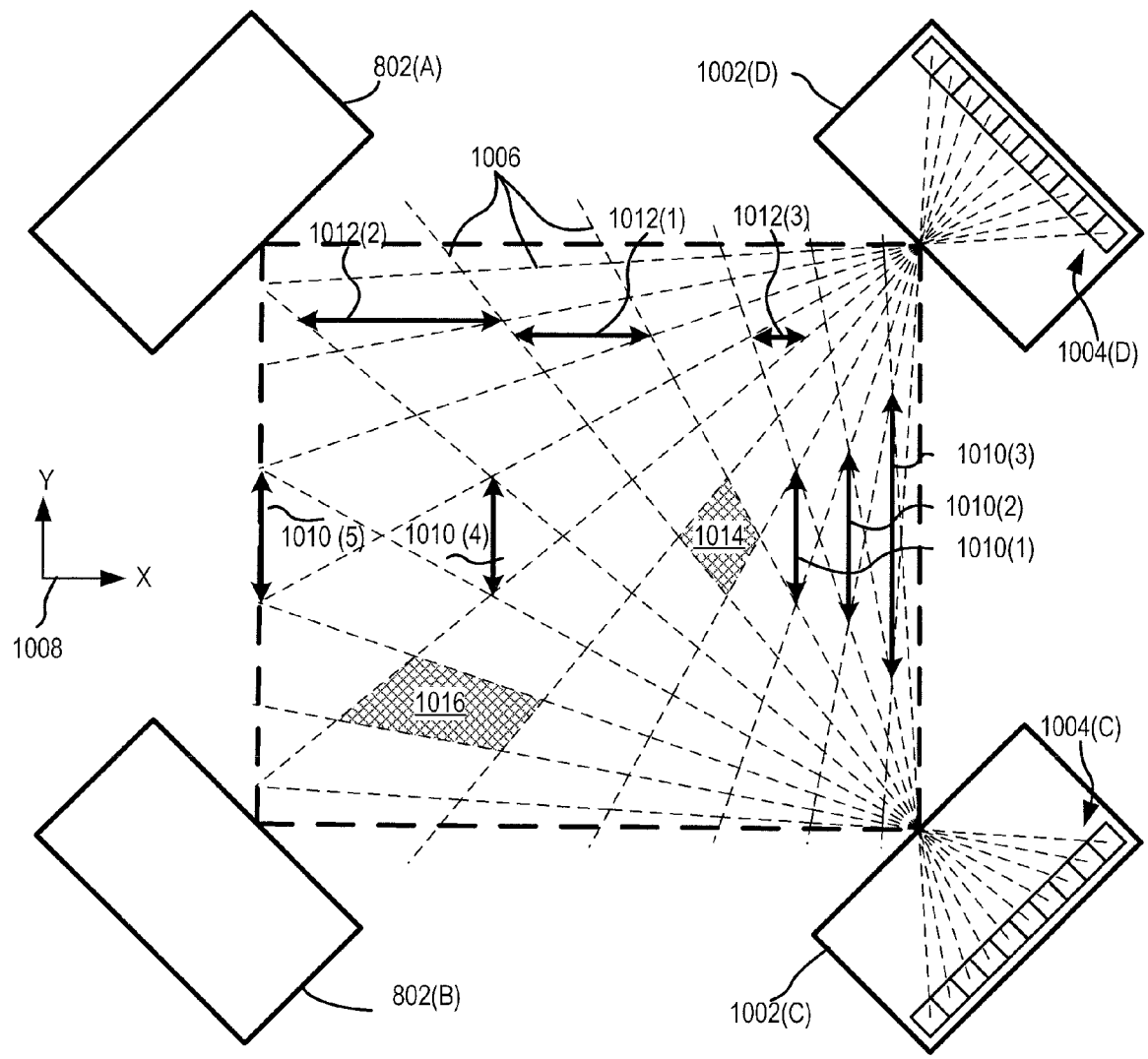
FIG. 10 shows analysis of position resolution of an optical input system including four image modules, according to an embodiment.

Furthermore, an optical position input system having four imager modules has additional advantages. For example, FIG. 10 illustrates a system that is based upon the system shown in FIG. 8 and includes two additional imager modules 1002(C) and 1002(D). For clarity of illustration, rays from pixels of the imager modules 802(A) and 802(B) are not shown in FIG. 10. Imager modules 1002(C) and 1002(D) are positioned opposite to imager modules 802(A) and 802(B). Each of the four imager modules is positioned near a respective corner of a rectangle for example. As illustrated in FIG. 10, for a pointing object close to the baseline connecting 802(A) and 802(B), imager modules 1002(C) and 1002(D) provide a better Y-resolution than imager modules 802(A) and 802(B), as indicated by a shorter arrow 1010(5) in FIG. 10 than a longer arrow 810(3) in FIG. 8. For imager modules of the same optical resolution, the Y-resolution on the baseline connecting imager modules 802(A) and 802(B) is the same as the Y-resolution on the baseline connecting imager modules 1002(C) and 1002(D). As the pointing object moves towards the baseline connecting imager modules 1002(C) and 1002 (D), images of imager modules 802(A) and 802(B) may be selected to yield better Y-resolution of the imaged pointing object than images of imager modules 1002(C) and 1002(D). For example, Y-resolution as indicated by a shorter arrow 810(4) is better than Y-resolution indicated by a longer arrow 1010(3). Image module pairs may be selected based upon their resolution values at the location of the pointing object being resolved.

In one example of operation of a system with four imager modules, images of imager modules 802(A) and 802(B) are used to provide better X-resolution when the pointing object is nearer the baseline connecting imager modules 802(A) and 802(B), as indicated by arrows 812(1), 812(2), and 812(3) in FIG. 8. Images of imager modules 1002(C) and 1002(D) are used to provide better X-resolution when the pointing object is nearer the baseline connecting 1002(C) and 1002(D), as indicated by arrows 1012(1), 1012(2), and 1012(3) in FIG. 10. Images of imager module pairs are simply selected based upon X-resolution.

For a given location of a pointing object, images of the adjacent imager module pair having the best X-resolution are used to determine the X-coordinate and images of the imager module pair having the best Y-resolution are used to determine the Y-coordinate, among all pairs of adjacent imager modules, for example, imager modules 802(A) and 802(B), imager modules 802(B) and 1002(C), image modules 802(A) and 1002(D), and 1002(C) and 1002(D). With such selection of imager module pairs, the most optimum uniformity of position resolution may be achieved for the pointing object.

In an alternative embodiment, for a given location of a pointing object, images of the imager module pair having the best combination of X-resolution and Y-resolution are used to determine the X and Y coordinates of the pointing object. The best combination of the X-resolution and Y-resolution is defined as the highest average resolution of X-resolution and Y-resolution.

In another example of operation of a system with four imager modules, imager modules 802(B) and 1002(C) provide a better combination of X-resolution and Y-resolution than imager modules 802(A) and 802(B) for a pointing object. Specifically, near the baseline connecting imager modules 802(A) and 802(B), imager modules 802(A) and 802(B) provides better X-resolution than imager modules 802(B) and 1002(C), as illustrated by arrow 912(3) in FIGS. 9 and 812(4) in FIG. 8. However, imager modules 802(A) and 802(B) provides a very poor Y-resolution near the baseline connecting imager modules 802(A) and 802(B), as indicated by 810(3) in FIG. 8. The Y-resolution provided by imager modules 802(B) and 1002(C) is better than imager modules 802(A) and 802(B), as illustrated by 910(1) in FIG. 9. Therefore, images of imager modules 802(B) and 1002(C) are used to determine X, Y coordinates of the pointing object because these images provide an optimum combination of X-resolution and Y-resolution as compared to other imaging pairs.

As illustrated in FIG. 9, a system using three imager modules may have orthogonal baselines connecting imager modules, but does not include parallel baselines, whereas, as illustrated in FIG. 10, a system using four imager modules has two additional pairs of parallel baselines. With the two additional pairs of parallel baselines, the X resolution and Y-resolution of the system using the four imager modules is more uniform within the active area as compared to a system having the three imager modules. For example, the X-resolution and Y-resolution of the system having the four imager modules are substantially the same near each of the parallel baselines by selecting image module pairs. The X-resolution and Y-resolution of the system having the three imager modules have less uniformity.

In an alternate embodiment, a final input position may be determined by averaging, weighted averaging, or selectively combining calculated positions. For example, X-coordinates are computed for each pair of adjacent imager modules. These X-coordinates are then averaged based on different weights to produce a final X-coordinate of the final input position. The weight of each X-coordinate depends upon its X-resolution. In one particular embodiment, the weight of each X-coordinate increases with its X-resolution. Similarly, Y-coordinates are computed for each pair of adjacent imager modules. These Y-coordinates are averaged based upon different weights to produce a final Y-coordinate of the final input position. The weight of each Y-coordinate depends upon its Y-resolution. In one particular embodiment, the weight of each Y-coordinate increases with its Y-resolution. Furthermore, a final object position value (X,Y) may be determined based on the statistics of the chosen or combined produced position values (X,Y) to provide substantially uniform X-resolution and Y-resolution.

Having described several embodiments, it will be recognized by those skilled in the art that various modifications, alternative constructions and equivalents may be used without departing from the spirit of the invention, for example, variations in sequence of steps and configuration and number of imager modules or cameras, etc. Additionally, a number of well known mathematical derivations and expressions, processes and elements have not been described in order to avoid unnecessarily obscuring the present invention. Accordingly, the above description should not be taken as limiting the scope of the invention.

It should thus be noted that the matter contained in the above description or shown in the accompanying drawings should be interpreted as illustrative and not in a limiting sense. The following claims are intended to cover generic and specific features described herein, as well as all statements of the scope of the present method and system.

What is claimed is:

1. An optical input system for detecting one or more input positions within an active touch area, comprising:
   at least three imager modules peripherally positioned around the active touch area, each imager module capturing images of at least one pointing object within the active touch area; and
   a processor for determining each of one or more input positions, relative to the active touch area, based upon the captured images,
   wherein the processor triangulating the one or more input positions based upon images captured by a pair of adjacent image modules, and then determining the one or more input positions as being commonly determined from each pair of adjacent imager modules, and
   wherein the step of determining the positions comprises:
      determining an X coordinate and a Y coordinate of each position for each pair of images at the position;
      selecting one of the X-coordinates based upon a highest X-resolution at the position; and
      selecting one of the Y-coordinates based upon a highest Y-resolution at the position.

2. The system of claim 1, wherein the active touch area is rectangular and the at least three imager modules are each located proximate to a different one of three corners of the active touch area.

3. The system of claim 1, the system further comprising a memory for storing reference images for each of the imager modules, the reference images being subtracted from the captured images to identify position of the at least one pointing object.

4. The system of claim 1, wherein each of the at least three imager modules comprises an image sensor selected from the group including a linear image sensor and a two-dimensional image sensor.

5. A method for determining positions of one or more pointing objects within an active touch area, comprising:
   simultaneously capturing images of the one or more pointing objects using at least three imager modules peripherally positioned around the active touch area; and
   for each pair of images captured from adjacent imager modules;
   triangulating potential positions of the one or more pointing objects based upon each pair of images; and
   determining the positions of the one or more pointing objects as being common to the potential positions determined from each pair of images,
   wherein the step of determining the positions comprises:
      determining an X coordinate and a Y coordinate of each position for each pair of images at the position;
      selecting one of the X-coordinates based upon a highest X-resolution at the position; and
      selecting one of the Y-coordinates based upon a highest Y-resolution at the position.

6. The method of claim 5, further comprising:
   storing a background image for each of the imager modules;
   extracting a differential image between the captured image and the associated background image; and
   segmenting the differential image.

7. The method of claim 6, further comprising:
   computing and storing a background image texture from each of the stored background images;
   computing image texture of the captured images; and
   extracting an area having differential texture between the computed image texture of the captured image and the associated background image texture.

8. The method of claim 6, the method further comprising updating the background image if no pointing objects are simultaneously detected by the at least three imager modules.

9. A method for determining positions of one or more pointing objects within an active touch area, comprising:
   simultaneously capturing images of the one or more pointing objects using at least three imager modules peripherally positioned around the active touch area; and
   for each pair of images captured from adjacent imager modules;
   triangulating potential positions of the one or more pointing objects based upon each pair of images; and
   determining the positions of the one or more pointing objects as being common to the potential positions determined from each pair of images,
   wherein the step of determining the positions comprises:
      determining X and Y coordinates of each position for each pair of adjacent imager modules; and
      selecting one pair of adjacent imager modules based upon an optimal combination of X-resolution and Y-resolution at the position for all pairs of adjacent imager modules.

10. An optical input system for detecting one or more input positions within a rectangular active touch area, comprising:
    four imager modules positioned proximate to four corners of the rectangular active touch area, each imager module capturing an image of at least one pointing object within the rectangular active touch area, wherein a connection between each two adjacent imager modules forms a baseline such that the system comprises four baselines, each of the four baselines being orthogonal to each adjacent baseline and being parallel to the other baseline; and
    a processor for triangulating the one or more input positions based upon captured images of the at least one pointing object, and determining the one or more input positions as being commonly determined from each pair of adjacent imager modules,
    wherein the determined positions comprise an X coordinate and a Y coordinate, the X coordinate being determined based upon a highest X-resolution for a first pair of adjacent imager modules, and the Y coordinate being determined based upon a highest Y-resolution for a second pair of adjacent imager modules.

11. An optical input system for detecting one or more input positions within a rectangular active touch area, comprising:
    four imager modules positioned proximate to four corners of the rectangular active touch area, each imager module capturing an image of at least one pointing object within the rectangular active touch area, wherein a connection between each two adjacent imager modules forms a baseline such that the system comprises four baselines, each of the four baselines being orthogonal to each adjacent baseline and being parallel to the other baseline; and
    a processor for triangulating the one or more input positions based upon captured images of the at least one pointing object, and determining the one or more input positions as being commonly determined from each pair of adjacent imager modules,
    wherein the determined positions comprise an X coordinate and a Y coordinate, the X and Y coordinates being determined based upon an optimum combination of X-resolution and Y-resolution for one pair of adjacent imager modules among all pairs of adjacent imager modules.

12. A method for determining positions of one or more pointing objects within a rectangular active touch area, comprising:

simultaneously capturing images of the one or more pointing objects using four imager modules peripherally positioned proximate each corner of the rectangular active touch area; and for each pair of images captured from adjacent imager modules, triangulating potential positions of the one or more pointing objects; and determining the positions of the one or more pointing objects as being common to the potential positions determined from each pair of images, wherein the step of determining the positions of the one or more pointing objects comprises:

determining an X coordinate based upon the highest X-resolution at the position for a first pair of the adjacent imager modules; and determining a Y coordinate based upon the highest Y-resolution for a second pair of the adjacent imager modules at the position.

13. A method for determining positions of one or more pointing objects within a rectangular active touch area, comprising:

simultaneously capturing images of the one or more pointing objects using four imager modules peripherally positioned proximate each corner of the rectangular active touch area; and for each pair of images captured from adjacent imager modules, triangulating potential positions of the one or more pointing objects; and determining the positions of the one or more pointing objects as being common to the potential positions determined from each pair of images, wherein the step of determining the positions of the one or more pointing objects comprises:

determining X and Y coordinates based upon an optimum combination of X-resolution and Y-resolution at the position within one pair of the adjacent imager modules.

* * * * *